Feb. 8, 1955 R. J. ALTGELT 2,701,510
QUICK DETACHABLE PLOW HITCH
Filed April 21, 1952 2 Sheets-Sheet 2
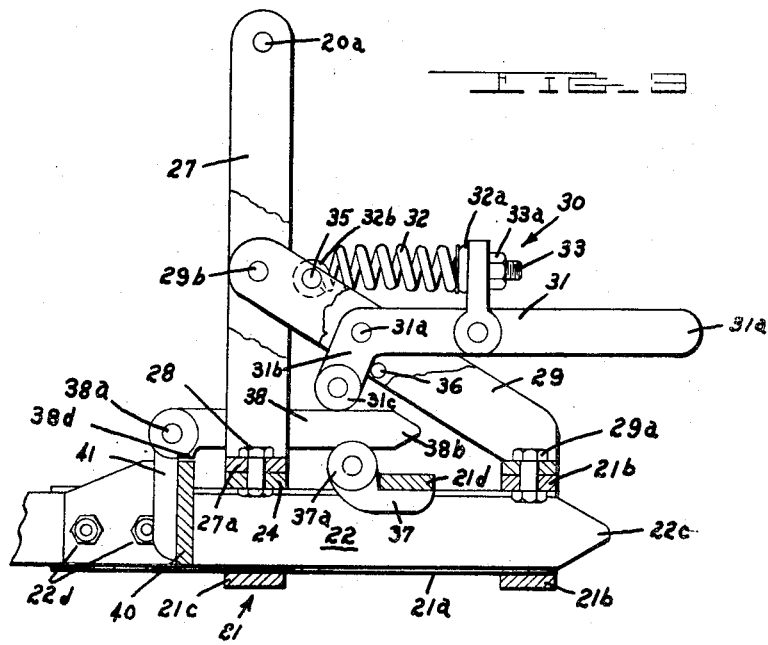
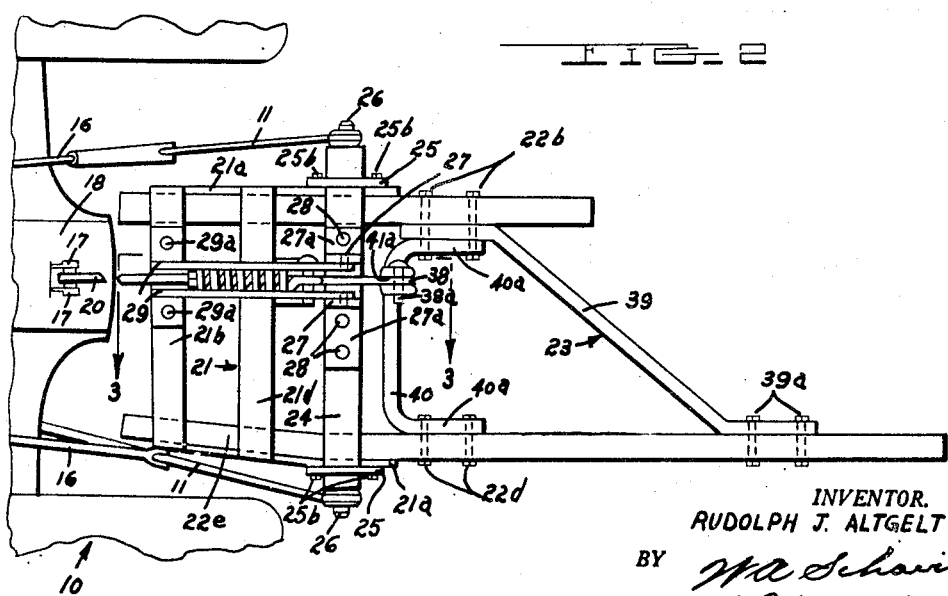
INVENTOR.
RUDOLPH J. ALTGELT

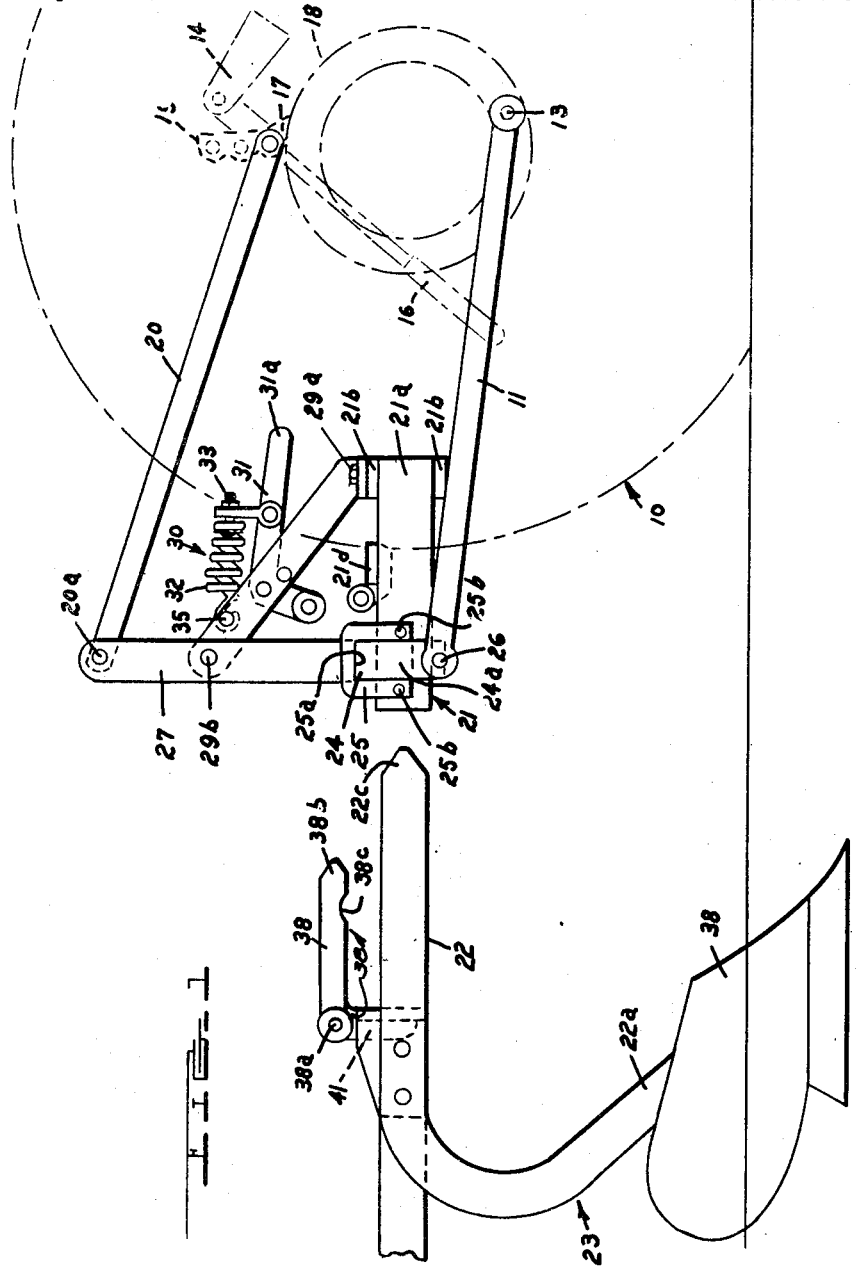

United States Patent Office 2,701,510
Patented Feb. 8, 1955

2,701,510

QUICK DETACHABLE PLOW HITCH

Rudolph J. Altgelt, South Bend, Ind., assignor, by mesne assignments, to Ford Motor Company, Dearborn, Mich., a corporation of Delaware Application April 21, 1952, Serial No. 283,476

1 Claim. (Cl. 97—47.14)

This invention relates to a quick detachable plow hitch for releasably attaching a plow to a tractor that has a pair of power lifted trailing hitch links.

In plowing the soil, hidden obstructions such as boulders or partially decayed tree stumps are occasionally struck by the plow bottom which inflicts a certain amount of damage to the plow and in some instances severe damage is sustained when the hidden obstruction is struck squarely. In such case the plow beams may be bent in addition to severely damaging the plow share and the moldboard. When this happens expensive replacement of parts is about the only course open to the farmer to satisfactorily recondition his plow.

For those tractors now in common use today which have a pair of power lifted trailing hitch links and a top link, plows as well as other implements are conveniently mounted directly on such links and ease in transporting and maneuverability in their use when so mounted are the desirable features. There is, however, one drawback with so mounting an implement and that is the difficulty usually encountered when connecting the two hitch links to two laterally spaced points on the implement while at the same time trying to effect connection of the third top link to still another point on the implement. Furthermore, it is a matter of some difficulty to provide for quick and automatic detachment of the implement if a hidden obstruction is encountered.

Accordingly it is an object of this invention to provide an improved quick detachable hitch for mounting implements on the trailing power lifted hitch linkage of a tractor.

Another object of this invention is to provide an improved implement hitch for a tractor having a pair of power lifted hitch links which facilitates the connection of an implement to such links.

Another object of this invention is to provide an improved quick detachable hitch for a tractor having a pair of laterally spaced power lifted hitch links and a top link to permit easy and rapid connection of an implement to such linkage and to permit manual or draft overload release of the implement from the tractor without stoppage of the tractor.

The specific nature of this invention, as well as other objects and advantages thereof, will become apparent to those skilled in the art from the following detailed description taken in conjunction with the attached drawings on which, by way of preferred example only, are illustrated one embodiment of this invention.

On the drawings:

Figure 1 is a side elevational view of a tractor showing the improved quick detachable hitch mounted on the trailing hitch linkage of the tractor and showing the implement released from such hitch;

Figure 2 is a reduced scale plan view of Figure 1 but showing the implement connected to the hitch; and Figure 3 is an enlarged scale sectional view taken along the plane 3—3 of Figure 2.

As shown on the drawings:

The improved quick detachable hitch to be more fully described comprises a cage-like structure on which there is mounted a transverse cross shaft. Horizontal mounting pins are respectively provided on the ends of such cross shaft which receive the trailing ends of a pair of power lifted hitch links mounted on a tractor. The cross shaft has a vertical strut member and to the upper end of such strut the tractor top link is pivotally mounted. The aforementioned cage defines in effect a socket which is preferably tapered forwardly and receives the forwardly converging ends of the plow beams of a two base moldboard plow. When the plow beam ends are fully received by the cage structure, a latching mechanism releasably secures the plow beam ends within the cage structure. The latching device is operable in response to a draft overload in excess of the normal plowing forces required to pull the plow through the ground to effect release of the plow from the hitch. The latch mechanism may also be conveniently manually operated from the tractor seat to effect release of the plow when desired.

The improved quick release hitch constructed in accordance with this invention, which will now be described in greater detail, is preferably used with a tractor 10 having a pair of trailing power lifted hitch links 11 universally connected to the tractor rear axle 12 at laterally spaced points 13. Tractor 10 has a pair of rock arms 14 respectively secured to the ends of a lateral rock shaft (not shown) and such rock shaft is rotated by a conventional built-in hydraulic mechanism (not shown). The ends of rock arms 14 are respectively connected to the medial portions of hitch links 11 by suitable connecting links 16. Tractor 10 also has a pair of upstanding laterally spaced lugs 17 integrally formed on top of the differential housing 18 between which there is mounted a rocker member 19. Rocker member 19 acts against a control spring (not shown) in a manner well-known. A top link 20 has its forward end pivotally connected to the rocker member 19.

A cage-like structure 21 is provided which defines a socket to receive an implement frame element, such as the forward ends of a pair of plow beams 22 of a two bottom moldboard plow 23 as will be later described. The cage 21 comprises a pair of longitudinally disposed side frame members 21a. At least one of the side frame members 21a converges forwardly as best shown in Figure 2 for a purpose to be later described. A pair of laterally extending top and bottom frame spacer members 21b are respectively secured by welding to the top and bottom front end portions of the side members 21a. A similar spacing member 21c is laterally secured to the underside of the trailing ends of the side frame members 21a as by welding and a fourth laterally extending member 21d is medially secured by welding to the top edges of the side frame members 21a. The side frame members 21a of the cage 21 are slightly deeper than the depth of the plow beams 22 of plow 23 thus forming a forwardly tapering horizontally disposed socket-like structure to relatively snugly but slidably receive the forward ends of the implement beams.

A rectangular bar-like cross shaft 24 is transversely mounted on the upper edges of the rear ends of the side frame members 21a and directly above the lateral frame member 21c. A pair of clamps 25 having rectangular apertures 25a therein are respectively secured as by bolts 25b to the vertical faces of the side frame members 21a. The transverse cross shaft 24 has its ends supported within the rectangular apertures 25a of the clamps 25. Clamps 25 when loosely secured to the frame sides 21a are angularly disposed and when bolts 25b are tightened the clamps 25 will assume a nearly vertical position (as shown in Figure 2) to securely lock the cross shaft 24 in a selected transverse position. My co-pending application Serial Number 128,846 filed November 22, 1949 for Plow Frame may be referred to for a more complete description of the clamp 25 if so desired. The cross shaft 24 has an end portion 24a which is offset downwardly as best shown in Figure 1 and a pair of horizontal mounting pins 26 are respectively suitably secured in the ends of cross shaft 24 which receive the apertured trailing ends of the tractor hitch links 11. The tractor top link 20 is mounted between a pair of upstanding struts 27 secured to the top of cross shaft 24. Struts 27 have their lower ends 27a bent at right angles to the upright portion thereof and a plurality of bolts 28 secure such bent end portions 27a to the cross shaft 24. The strut members 27 are spaced apart laterally sufficient to permit the trailing end of hitch link 20 to be pivotally mounted therebetween on a transverse pin 20a. A pair of braces 29 have their forward ends secured by bolts 29a to the top face of the forward laterally extending frame member 21b. The braces slope rearwardly and upwardly and have their rear ends respectively secured by a transverse bolt 29b to the upstanding strut members 27.

The plow beams 22 when received by cage structure 21 are releasably latched to such cage and a draft responsive mechanism 30 is utilized to effect the latching. The draft responsive device comprises a bell crank lever 31 which has its vertex pivotally mounted by a pin 31a between the laterally spaced braces 29, the pin 31a being disposed slightly above the medial portion of such braces. The bell crank lever 31 has a forwardly projecting handle 31a which may be conveniently reached by the tractor operator from the tractor seat. The other lever arm 31b of bell crank lever 30 has a horizontally disposed cylindrical end portion 31c for a purpose to be later described. A tension spring 32 is provided to bias the lever portion 31b of bell crank 31 in a counterclockwise direction (as shown in Figure 3). The spring 32 has its forward end shaped into an eye 32a through which a bolt 33 is inserted to secure such end to an upstanding arm 34 welded or otherwise secured to the lever arm 31a of bell crank lever 31. A nut 33a secures bolt 33 to the vertical arm 34. A transverse pin 35 is inserted through suitably aligned transverse apertures provided near the upper rear ends of braces 29, and the rear end of spring 32 has an eye 32b which conveniently surrounds pin 35 to secure the rear end of spring 32 thereto. A stop pin 36 transversely mounted in the braces 29 at a medial point in such braces limits the downward throw or clockwise movement of the lever arm 31b. On the lateral frame member 21b opposite the vertical struts 27 there is welded a catch 37. The catch 37 has a horizontal transversely disposed cylindrical top portion 37a which is engaged by a latch 38 provided on the plow beams 22 as will now be described. Moldboard plow 23 previously referred to comprises the usual pair of laterally spaced plow beams 22 which have depending forwardly sloping rear end portions 22a on which there are suitably mounted a pair of plow bases 38 only one of which is shown. One of the plow beams 22 has an inwardly bent front end portion 22e as best shown in Figure 2 which has the same angle of convergence as the inwardly converging side frame member 21a of the cage structure 21. The forward ends of beams 22 are pointed as shown at 22c for a purpose to be later explained. Plow beams 22 are maintained in laterally spaced parallel relationship by a rearwardly angled brace 39 and a forward U-shaped laterally disposed brace 40 having longitudinal arms 40a. The forward end of brace 39 and one of the arms 40a of brace 40 are secured to the straight beam 22 by the common bolts 22b. The rear end of sloping brace 39 is secured to the other beam by a pair of bolts 39a while the other arm 40a of brace 40 is secured to the opposite beam 22 by a pair of bolts 22d. Latch 38 is pivotally mounted to an upstanding bracket or arm 41 welded to the brace 40 in longitudinal alignment with the upstanding struts 27. The upper end of the bracket 41 is of substantially cylindrical form and is bifurcated as shown at 41a to receive therebetween the rear end of latch 38. A transverse bolt or pin 38a pivotally secures latch 38 to arm 41. Latch 38 has a forwardly pointed end 38b for a purpose to be presently explained. Just rearwardly of the pointed end 38b of latch 38 there is provided a substantially semi-cylindrical notch 38c. Latch 38 has an integral stop portion 38d on its underside which limits its clockwise movement when engaged with the top of brace 40 to facilitate re-engagement of the latch 38 with catch 37.

*Operation*

The plow 23 is quickly and readily attached to the cage portion 21 mounted on the trailing linkage of tractor 10 by elevating the cage structure 21 to the same height as that of the plow beams 22 and backing the tractor so that the cage structure 21 slides over the forward ends of the plow beams 22. The converging relationship of beams 22 and the pointed ends 22c thereof facilitate the entrance of such beams into the socket defined by the cage 22. The pointed end 38b of latch 38 enters between the cylindrical end 31c of the draft responsive device 30 and the cylindrical end 37a of the catch member 37. The handle 31a of the bell crank 31 may be manually forced downwardly to facilitate the entrance of the latch as just mentioned and when the bent end 22a of the upper beam 22, as shown in Figure 2, lies contiguous to the similarly bent frame member 21a, the notch 38c in latch 38 will be directly above the cylindrical portion 37a of catch 37. Release of handle 31a will then permit the rounded end 31c of the pressure responsive device 30 to bear against the top edge of latch 38 to yieldingly maintain such latch in locked position.

With the plow beams assembled to the cage structure 21, the plow may then be readily transported to the working area by simply raising the hitch links 11. It will be appreciated that the plow may be quickly and readily detached from the cage structure 21 by simply lowering the hitch links 11 until the plow bottoms 38 rest on the ground and then manually depressing the lever 31 whereupon the tractor is driven forwardly and latch 38 is cammed upwardly out of engagement with catch 37 by the forward motion of the tractor and the plow is detached from cage 21.

When plowing with the plow 23 secured within the cage 21 and a hidden obstruction is struck by the plow bottoms 38, a greater than normal draft force will be exerted. In such case the greater resistance of the plow will be sufficient to cam the draft responsive device 30 upwardly to permit release of latch 38 from catch 37 thereby releasing the plow from the tractor and avoiding serious damage to the plow. Re-engagement of the plow beams is readily effected as above described by simply backing the tractor so that the beams will be received by the cage structure 21 whereupon the plow can be moved rearwardly and elevated by raising the hitch links 11 to pass over the obstruction.

It will be appreciated that the above described hitch may be readily utilized for attachment of any type of soil working implements to the tractor hitch links that can be lifted by such links to provide the same benefits of assembly and disassembly as well as overload release protection for such other implements.

It will thus be apparent from the foregoing description that there is here provided an improved quick detachable and overload releasable hitch for a tractor having a three point hitch linkage which permits rapid and easy attachment of an implement to such linkage. This improved hitch not only facilitates assembly and disassembly of implements to the tractor but provides an effective overload release of the implement from the tractor.

It will, of course, be understood that many details of construction may be varied through a wide range without departing from the principles of this invention and it is, therefore, not the purpose to limit the patent granted hereon otherwise than necessitated by the scope of the appended claim.

I claim:

For use with a tractor having a pair of laterally spaced, power liftable, hitch links and a top link vertically spaced between the hitch links, an implement having a pair of laterally spaced, forwardly projecting beams, a latch carried by said implement generally intermediate said beams, an implement attaching frame attachable to the free ends of said links, means on said frame defining a longitudinally extending socket into which the forward ends of said beams are snugly insertable, said frame and said beams being comovable both vertically and laterally, spaced latch-engaging elements on said frame adapted to receive said latch therebetween when said beams are inserted into said socket, and resilient means urging one of said elements into contact with said latch, said latch being removable from engagement with said elements against the bias of said resilient means to release the implement when the implement is subjected to a draft overload.

References Cited in the file of this patent

UNITED STATES PATENTS

| 1,410,486 | Lee | Mar. 21, 1922 |
| 1,430,922 | Mueller | Oct. 3, 1922 |
| 1,744,612 | Conner | Jan. 21, 1930 |
| 2,341,807 | Olmstead et al. | Feb. 15, 1944 |
| 2,368,266 | Silver | Jan. 30, 1945 |
| 2,505,609 | Ego | Apr. 25, 1950 |
| 2,562,817 | Pethick | July 31, 1951 |
| 2,602,389 | Markel | July 8, 1952 |